United States Patent [19]

Vogt et al.

[11] Patent Number: 4,472,927
[45] Date of Patent: Sep. 25, 1984

[54] METHOD AND MEANS FOR ADJUSTING HAY CONDITIONER ROLLS

[75] Inventors: James L. Vogt; Bobby G. Sawyer, both of Ottumwa; Steven L. Hoskins, Albia, all of Iowa

[73] Assignee: Deere & Company, Moline, Ill.

[21] Appl. No.: 400,822

[22] Filed: Jul. 22, 1982

[51] Int. Cl.³ .................................. A01D 82/00
[52] U.S. Cl. .................. 56/16.4; 56/DIG. 1; 100/171; 241/233
[58] Field of Search ........... 56/DIG. 1, DIG. 2, 14.1, 56/16.4, 192, 13.6; 100/99, 168-171; 241/230, 233, 234, 232, 238

[56] References Cited

U.S. PATENT DOCUMENTS

| | | | |
|---|---|---|---|
| 3,339,352 | 9/1967 | Burrough et al. | 56/DIG. 1 |
| 3,401,507 | 9/1968 | Yetter | 56/DIG. 1 |
| 3,474,601 | 10/1969 | Burrough et al. | 56/DIG. 1 |
| 3,505,796 | 4/1970 | Halls et al. | 56/DIG. 1 |
| 3,722,190 | 3/1973 | Fisher | 56/DIG. 1 |
| 3,747,310 | 7/1973 | Calder | 56/DIG. 1 |
| 3,797,207 | 3/1974 | Sawyer et al. | 56/DIG. 1 |
| 4,035,991 | 8/1977 | Oosterling et al. | 56/DIG. 1 |
| 4,127,066 | 11/1978 | Sharkey | 100/168 |

FOREIGN PATENT DOCUMENTS 1151694  7/1963  Fed. Rep. of Germany ...... 241/230

Primary Examiner—Gene Mancene
Assistant Examiner—John G. Weiss
Attorney, Agent, or Firm—Henderson & Sturm

[57] ABSTRACT

Disclosed is a hay conditioner of basically typical construction in which the improvement lies in adjustable stop means for use in setting and varying the clearance between the upper and lower conditioning rolls. There is provided at each side of the machine a means including a lever arm disposed below a support for the upper roll and pivoted at one end on the adjacent side of the machine frame, the other end being connected to a screw-threaded adjustment link effective to elevate the lever for engagement with the upper roll support and thus to selectively limit downward movement of the upper roll under action of the usual biasing means. Thus, the upper roll is free to move upwardly in response to crops passing between the rolls, but its downward movement is limited to the stopped position selected by the adjustment link. The link extends upwardly to a free end that is easily accessible to receive a force-applying tool.

4 Claims, 3 Drawing Figures

METHOD AND MEANS FOR ADJUSTING HAY CONDITIONER ROLLS

BACKGROUND OF THE INVENTION

A conventional hay conditioner includes a fore-and-aft frame mounted on wheels for advance over a field under the power of a towing tractor or under its own power if it is of the self-propelled type. The machine has upper and lower, transverse conditioner rolls through which the mowed crops pass from front to rear, being re-deposited on the field behind the machine. Typically, the upper roll is mounted for movement toward and away from the lower roll and is biased downwardly for upward bodily movement in response to crops passing between the rolls. It is important that a predetermined clearance be maintained between the surfaces of the rolls, the amount of clearance depending in large part upon the nature of the crops being conditioned. For most conditions, a minimum clearance is desired to achieve maximum conditioning of alfalfa and other high value crops. Some other crops require a relatively wide gap for appropriate feeding and conditioning. The rolls should not operate in continuous contact with each other. Minimum clearance is thus the closest spacing which may be achieved without the rolls coming into contact during normal operation of the conditioner.

The position of the upper roll relative to the lower roll is typically controlled by an adjustable stop. The stop means is only one-way effective; that is to say, the upper roll is free to move upwardly when crop conditions are such as to cause the rolls to spread. But upon downward movement after the condition has passed, the stop limits the upper roll to the preselected position.

Heretofore, such stops have been provided, but are difficult to adjust both at the time of manufacture and at the time of field servicing. They often required removal and replacement of shims or adjustment of a roll stop jack, the loosening and/or removal of several bolts and nuts, and finally, replacement and retightening of all the removed and loosened parts. Such tasks are relatively arduous and cannot be performed while the rolls are rotating.

SUMMARY OF THE INVENTION

In accordance with this invention, a method is provided for adjusting such rolls with increased simplicity and precision. The method includes the steps of first adjusting the rolls, while they are being driven via the drive train for rotating the rolls during normal machine operation, until the rolls come into contact (preferably slightly) and generate sufficient noise to be audible to the operator. Then, the rolls are adjusted to disengage the rolls by a predetermined amount. During adjustment, the rolls are driven preferably at tractor idle speed.

Further in accordance with the features of this invention, an improved adjusting means is provided and is preferably used in the practice of the foregoing method. The means includes a lever arm arrangement that makes the adjustment of one of the rolls quite easy and precise. An adjusting link of the improved means on each side of the main frame is readily accessible from above and may be turned by an ordinary tool such as a wrench. Since the rolls may be adjusted while running, high and low spots on the surfaces are automtically detected by the noise generated upon contact and the limit precisely determined. This is important because the rolls, due to manufacturing tolerances, are not perfectly concentric. The invention is especially useful because prior adjustment methods make it very difficult first to identify the closest clearance locations between rolls (which are common betwen about 2 to 3 meters in length) both circumferentialy and longitudinally, and then to correctly accomplish the appropriate adjustment. Other features of the invention will be apparent as the disclosure progresses.

DESCRIPTION OF THE PREFERRED EMBODIMENT

Figure 1:
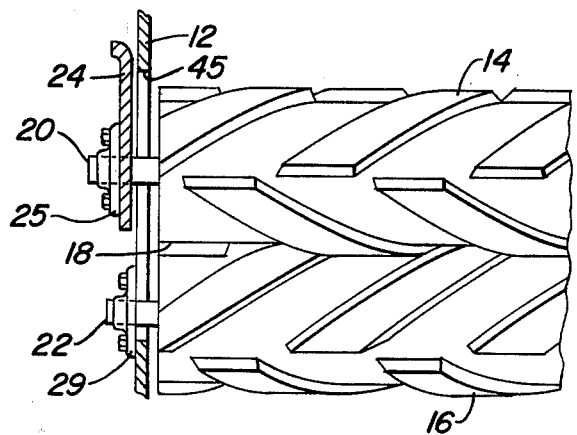
FIG. 1 is a fragmentary rear view of a pair of typical conditioner rolls taken along line 1—1 of FIG. 2.

As is conventional, the hay conditioner has a fore-and-aft main frame 10, usually including opposite, upright sidewalls, one of which appears at 12, suitably cross-connected by appropriate structure (not shown). Transverse upper and lower conditioner rolls 14 and 16, respectively, are appropriately journalled at opposite ends in the sidewalls. The rolls shown here have configured surfaces and are adapted to "mesh". FIG. 1 shows a representative form of such means at 18. Upper and lower roll shafts 20 and 22, respectively, extend leftwardly and are driven in timed relation to each other by a gear train or the like (not shown) as is well known. The rolls thus do not depend upon meshing to cause them to rotate. Since the roll mounting and adjustment means are the same at both sides of the machine, or at both ends of the rolls, only one side or end will be described in detail.

Figure 2:
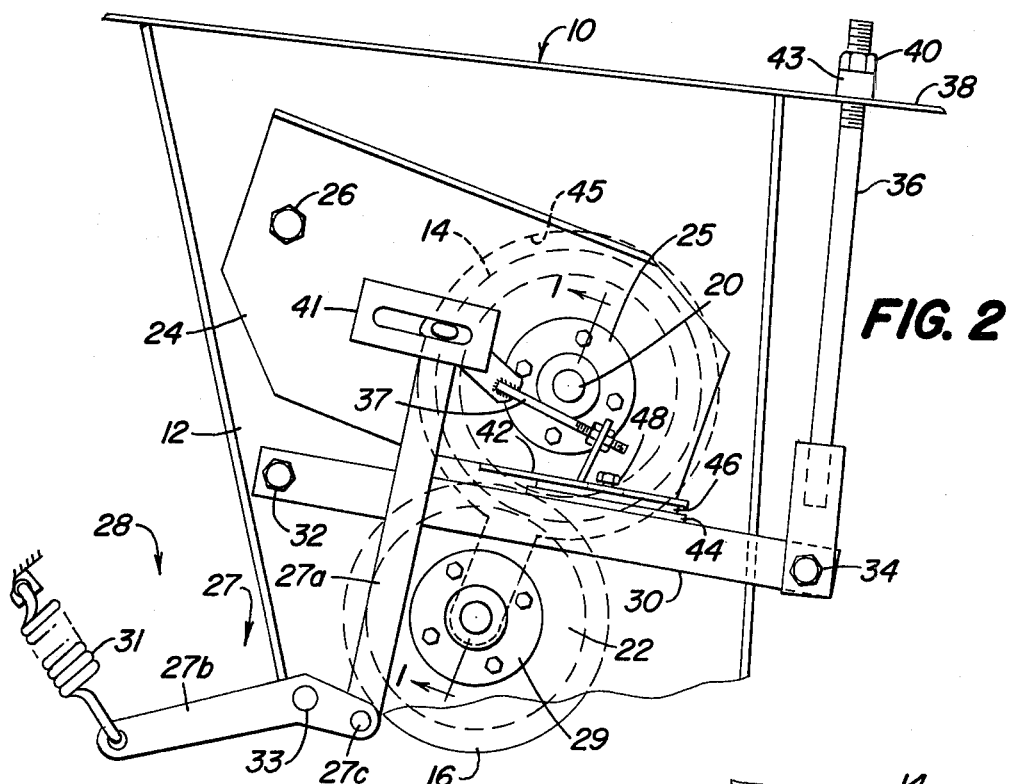
FIG. 2 is an elevation, with parts broken away, of the rolls and their relationship to each other.

As best shown in FIG. 2, each end of the upper roll shaft extends through an opening 45 (only one shown) and is carried by a frame-mounted support in the form of an arm 24. Arm 24 journals the adjacent end of the roll shaft in bearings 25 (only one shown) and is pivoted to the sidewall 12 by a transverse pivot means 26. Each support and of course its roll is biased downwardly or toward the lower roll by biasing means 28, which may be of any appropriate form, that shown being representative and not itself forming part of the invention. Bias means 28 includes a bell crank 27 pivoted to the sidewall 12 at pivot 33, a bias spring 31 connected between one end of crank 27 and the frame and a link 27a pivotally connected to crank 27 by a pivot 27c and pivotally connected to a bracket 41 fixed to support arm 24. Crank 27 includes a pair of crank arms 27a and 27b pivoted to each other at pivot 27c. The bias of roll 14 toward roll 16 is adjustable via adjustment of a bolt 37 connected between link 27a and roll support arm 24. As bolt 37 is adjusted to the left or right in FIG. 2, relative to support arm 24, the position of crank arm 27a is adjusted back and forth in a bracket 41 on support arm 24 to change the lever arms of crank 27 and support arm 24. In the way the bias of roll 14 toward roll 16 may be adjusted. The lower roll is fixed as to location in sidewalls 12 in bearings 29 (only one shown).

In the absence of some form of stop means, the biasing means 28 would force the upper roll tightly against the lower roll and the confronting surfaces of the rolls would run in contact with each other. This is clearly undesirable because such condition would result in serious damage to the machine. The damage results, in part, from the fact that intermeshing rolls driven at the same rotational speed have different surface speeds at the points of intermeshing engagement causing scuffing of the rolls, and noise and torsional vibration in the drive train. As previously noted stops in general are known, but, as pointed out, such stops are difficult to adjust and cannot be adjusted while the rolls are turning. The adjustable stop means in the present case includes, at each side of the machine, a fore-and-aft lever arm 30 mounted on the adjacent sidewall 12 by a transverse pivot means 32, the lever extending away from the pivot and at a level below the upper roll support 24 to an opposite end where it is connected at 34 to the lower end of adjustment means in the form of a generally upright link 36. The upper portion of this link extends through a suitable aperture (not shown) in a flange 38 forming part of the sidewall 12. The upper end of link 36 is threaded and receives a spacer 43 and a nut 40 which is receivable of a suitable force-applying tool (not shown). Thus, the upper end of the link 36 as represented by the nut 40 is easily accessible at an upper part of the sidewall and is not located in the area of the rolls and additional drive chains, belts, etc. usually associated with this end of the roll means. Such additional components have been eliminated from the drawings in order to better illustrate the invention.

The lower portion of the upper roll support 24 has rigidly affixed thereto a fore-and-aft and laterally outwardly extending flange or ledge 42 and a like flange or ledge 44 is affixed to the upper edge of the lever arm 30. The lower flange, preferably by means of a cushioning element 46 sandwiched between the flanges, is thus able to raise the upper roll support when the link 36 is tightened to raise the lever arm about its pivot 32. The cushioning element is secured to the lower flange by removable means 48 so that the element can be removed and replaced when worn. The insertion of the cushioning element minimizes noise and vibration as the upper roll swings away from the lower roll in response to crop conditions and then returns to its stopped positon. Adjustment of the link accomplishes a desired clearance or gap between the roll surfaces, as appears in FIG. 3 at 50, which setting depends upon the recommendations of the manufacturer of the machine. Also in FIG. 3, the part circles 52 and 54 may be taken to represent the surfaces of smooth-surfaced rolls or as the pitch circles of configured or "meshing" rolls, it being noted that the rolls in FIG. 2 are illustrated by double circles for configured rolls. See also FIG. 1.

Figure 3:
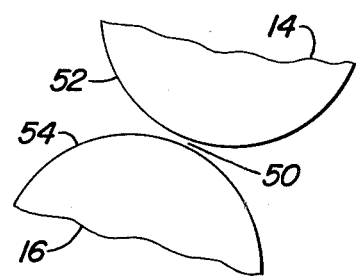
FIG. 3 is a fragmentary elevation illustrating a typical roll clearance, as in the case of smooth-surfaced rolls or considering the pitch circles of rolls having configured surfaces.

In accordance with the method of this invention, which is the preferred manner of operating the adjusting means, it is assumed that the hay conditioner is of the tractor-drawn type. To practice the methods, the tractor is stopped and its engine is running preferably at idle speed. The drive train to the rolls is engaged and the rolls are turning. The nut 40 at one side of the machine is loosened, lowering the stop means at 42-44-46 until the upper roll 14 engages or contacts the lower roll 16. This will result in relatively considerable noise and vibration. The nut is then tightened until the noise and vibration cease, which means that the rolls are clear of each other. The nut is tightened sufficiently more to achieve the proper clearance at 50 (FIG. 3). The procedure is repeated at the other side of the machine.

The main features and advantages of the invention have already been pointed out and need not be repeated. Other features and advantages, as well as modifications in the preferred embodiment disclosed, will occur to those versed in the art. As an example, the upper roll 14 may be fixed and the lower roll 16 may be fixed to a support arm for adjustment relative to fixed roll 14. In addition, the pivot point of the support arm 24 may be located forwardly of roll 14, 16, if desired, with appropriate relocation of lever 30 and link 36. It is intended that these and other modifications of the preferred embodiment be covered with the scope of the appended claims.

We claim:

1. A hay conditioner having a fore-and-aft frame carrying upper and lower transverse conditioning rolls, one of said rolls being fixed as to location and the other of said rolls having a frame-mounted support carrying it for bodily movement toward and away from the fixed roll, means biasing the support and movable roll normally toward the fixed roll, and adjustable stop means for selectively limiting movement of the support and movable roll toward the fixed roll for varying the clearance between the roll surfaces according to crop conditions, characterized in that the adjustable means comprises an elongated fore-and-aft lever arm separate from the roll support and having a first end disposed on one side of the rolls and a second end disposed on the opposite side of the rolls, pivot means mounting one end of the lever arm on the frame for swinging about a transverse axis, adjusting means connected between the frame and the other end of the lever arm for swinging the lever arm about its pivot means against the force of the biasing means, and one-way means on the lever arm for engagement with the support upon said swinging of the lever arm to cause selective movement of the movable roll and support away from the fixed roll while leaving the movable roll and support free to move away from the fixed roll against the biasing means in response to crops passing between the rolls.

2. A hay conditioner as in claim 1, further characterized in that the fixed roll is the lower roll, the movable roll is the upper roll and the lever arm extends below the upper roll support and the one-way means engages the support from below.

3. A hay conditioner as in claim 1, in which the adjusting means between the frame and lever arm extends upwardly to a relatively easily accessible upper end and said upper end includes a tool-receiving portion for effecting adjustment.

4. A hay conditioner as in claim 1, further characterized in that the lever arm is disposed on fixed side of said movable roll support, the support has a flange, the lever arm has a cooperative flange overlapping the first-mentioned flange, and the flanges provide the one-way means for causing movement of said other roll and support away from said one roll when the lever is moved and for also limiting movement of said movable roll and support toward said fixed roll when the adjustment means position is selected and set.

* * * * *

UNITED STATES PATENT AND TRADEMARK OFFICE
CERTIFICATE OF CORRECTION

PATENT NO. : 4,472,927

DATED : Sep. 25, 1984

INVENTOR(S) : James L. Vogt, Bobby G. Sawyer, and Steven L. Hoskins

It is certified that error appears in the above-identified patent and that said Letters Patent are hereby corrected as shown below:

In column 2, lines 56 and 57, delete "Crank 27 includes a pair of crank arms 27a and 27b pivoted to each other at pivot 27c".

In column 2, at line 64, In "the" way should be In --this-- way.

In column 4, at line 12, "roll" should be --rolls--.

In Claim 4, column 4, at line 56, change "fixed" to --one--; At line 57, delete "movable".

Signed and Sealed this

Twelfth Day of March 1985

[SEAL]

Attest:

DONALD J. QUIGG

Attesting Officer

Acting Commissioner of Patents and Trademarks